United States Patent [19]

Orain

[11] Patent Number: 4,484,900
[45] Date of Patent: Nov. 27, 1984

[54] ARTICULATED TRANSMISSION JOINT INCLUDING ROLLERS

[75] Inventor: Michel A. Orain, Conflans Ste Honorine, France

[73] Assignee: Glaenzer Spicer, Poissy, France

[21] Appl. No.: 524,692

[22] Filed: Aug. 19, 1983

Related U.S. Application Data

[63] Continuation of Ser. No. 276,634, Jun. 23, 1981, abandoned.

[30] Foreign Application Priority Data

Jul. 7, 1980 [FR] France .................. 80 15061

[51] Int. Cl.³ .............................................. F16D 3/22
[52] U.S. Cl. ................................ 464/111; 464/124; 464/132; 464/905
[58] Field of Search ............... 464/111, 123, 124, 131, 464/132, 133, 905

[56] References Cited

U.S. PATENT DOCUMENTS

| 3,613,396 | 10/1971 | Drevard et al. | 464/111 |
| 3,748,869 | 7/1973 | Orain | 464/132 |
| 3,757,534 | 9/1973 | Orain | 464/111 |
| 4,224,806 | 9/1980 | Kobayashi | 464/111 |

FOREIGN PATENT DOCUMENTS 3006161 8/1980 Fed. Rep. of Germany .

Primary Examiner—Stuart S. Levy
Assistant Examiner—Daniel P. Stodola
Attorney, Agent, or Firm—Wenderoth, Lind & Ponack

[57] ABSTRACT

An articulated transmission joint includes a plurality of arms, each arm carrying a roller. Each roller is biased axially outwardly of the respective arm by an elastically yieldable device which is operative between a washer rigid with a hub carrying the arms of the joint and the inner end of a groove formed in the axially inner face of the roller. The elastically yieldable device is fully withdrawable into the groove when it is compressed so as to avoid reducing the effective thickness of the hub.

10 Claims, 5 Drawing Figures

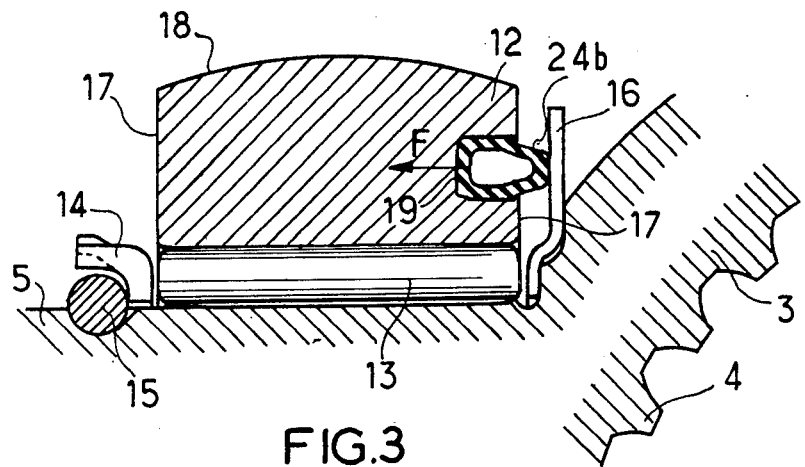
FIG.3
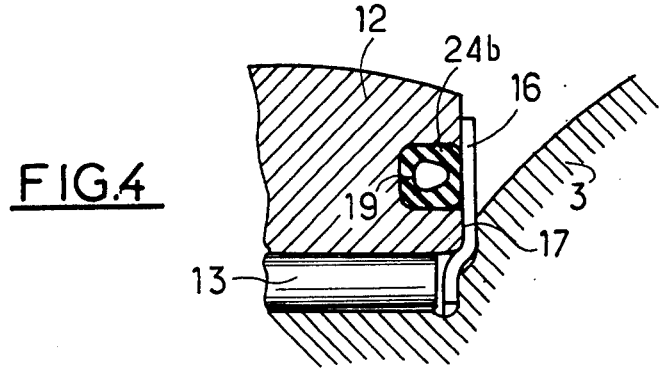
FIG.4
FIG.5
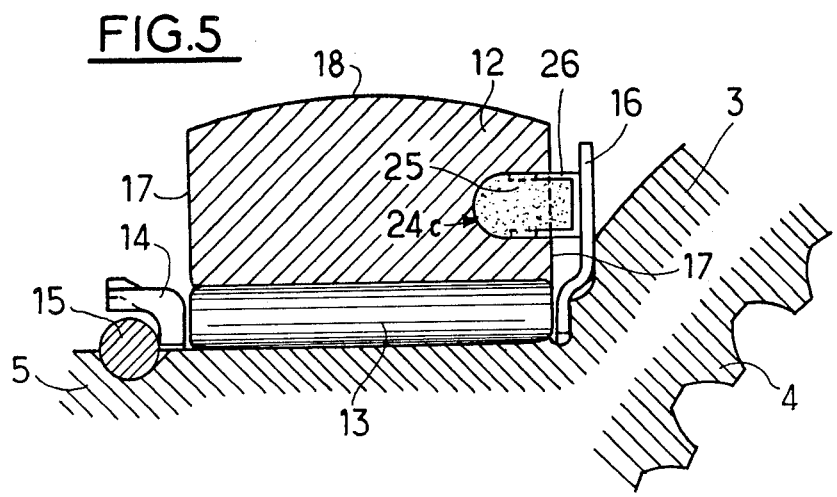

ARTICULATED TRANSMISSION JOINT INCLUDING ROLLERS

This application is a continuation, of now abandoned application Ser. No. 276,634, filed June 23, 1981.

BACKGROUND OF THE INVENTION

The present invention relates to articulated transmission joints including rollers, of the type comprising a male element which has a hub from which extend arms or trunnions on each of which is rotatably and slidably mounted a roller, and a female element which defines runways respectively receiving the rollers, each arm of the male element being provided with a clearance-taking up device which biases the corresponding roller outwardly. Articulated joints of the tripod type are an example of these joints employed in particular in automobile vehicles.

It is known that in order to obtain a satisfactory operation of tripod joints, a slight clearance, of for example 0.02 to 0.15 mm, must be provided between the diameter of the runways and the spherical diameter of the rollers so as to avoid any contact between the roller and the runway which is not subjected to the transverse force of the effective torque. Now, this clearance may result in an undesirable tapping when suddenly reversing the torque to be transmitted through the joint. In order to overcome this drawback, various clearance-taking up devices have been proposed. In particular, French patent application N° 79 04113 teaches the use of a spring which biases each roller outwardly, which constitutes a solution which is applicable even when the rollers are journalled on needles and are in one piece.

However, although the overall size of the spring is very small, the arrangement of this patent application reduces the thickness of the hub of the tripod element in the region of the spring by an amount which is sufficient to substantially decrease the strength of the joint when it is necessary to adopt a clearance-taking up device on an existing joint for a new application.

SUMMARY OF THE INVENTION

An object of the present invention is to provide in a simple, reliable and cheap manner a transmisson joint whose clearance taking-up device is powerful and effective but does not reduce the strength of the joint for given dimensions of the latter.

According to the invention, there is provided a transmission joint including rollers of the aforementioned type, wherein the clearance-taking up device comprises at least one elastically yieldable means which is operative between means defining a surface rigid with the hub and the inner end of a groove formed in the axially inner annular face of the roller.

The elastically yieldable means, which is preferably annular, may comprise a spring having a single coil such as that described in the aforementioned patent application, or a compressible member of elastomer or of expanded plastics material which may be maintained in a U-shaped support which is open toward the roller and is slidable in the cavity of the roller.

BRIEF DESCRIPTION OF THE DRAWING

Further features and advantages of the invention will be apparent from the ensuing description which is given merely by way of example with reference to the accompanying drawings, in which:

FIG. 3 is a partial cross-sectional view of a transmission joint according to a second embodiment of the invention;

FIG. 4 is a view corresponding to a part of FIG. 3 in which the clearance-taking up device is in its fully compressed state, and FIG. 5 is a view similar to FIG. 4 of a transmission joint according to a third embodiment of the invention.

DETAILED DESCRIPTION OF THE DRAWING

Figure 1:
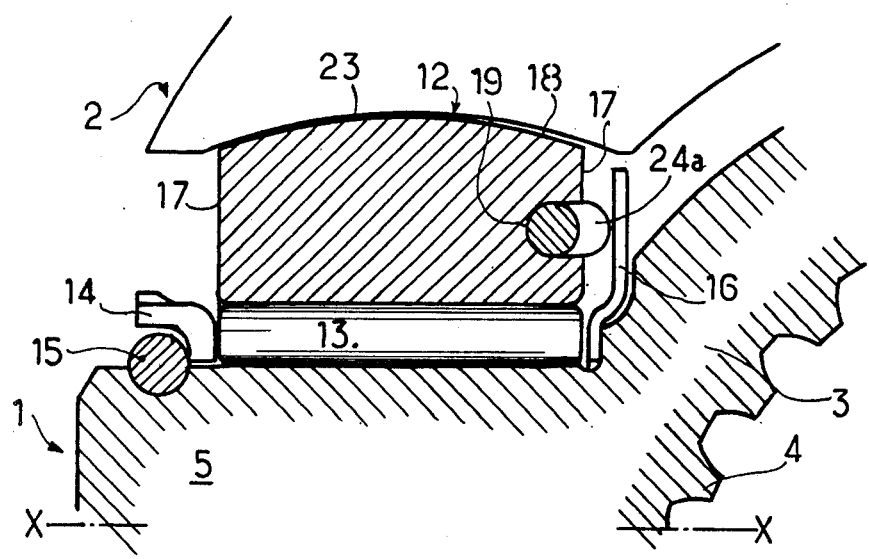
FIG. 1 is a partial cross-sectional view of a transmission joint according to the invention in the unstressed state of the clearance-taking up device.

Each of the transmission joints partly shown in the drawings in a homokinetic joint of the tripod type. It comprises a male or tripod element 1 and a female or tulip element 2.

The tripod element comprises a centre hub 3 which has internal splines 4 for fixing the hub to a shaft (not shown). Radially extending from the outer surface of this hub are three cylindrical arms or trunnions 5 which are spaced angularly 120° apart from each other. One of these arms is shown in the drawings and has an axis designated by X—X in FIG. 1.

Figure 2:
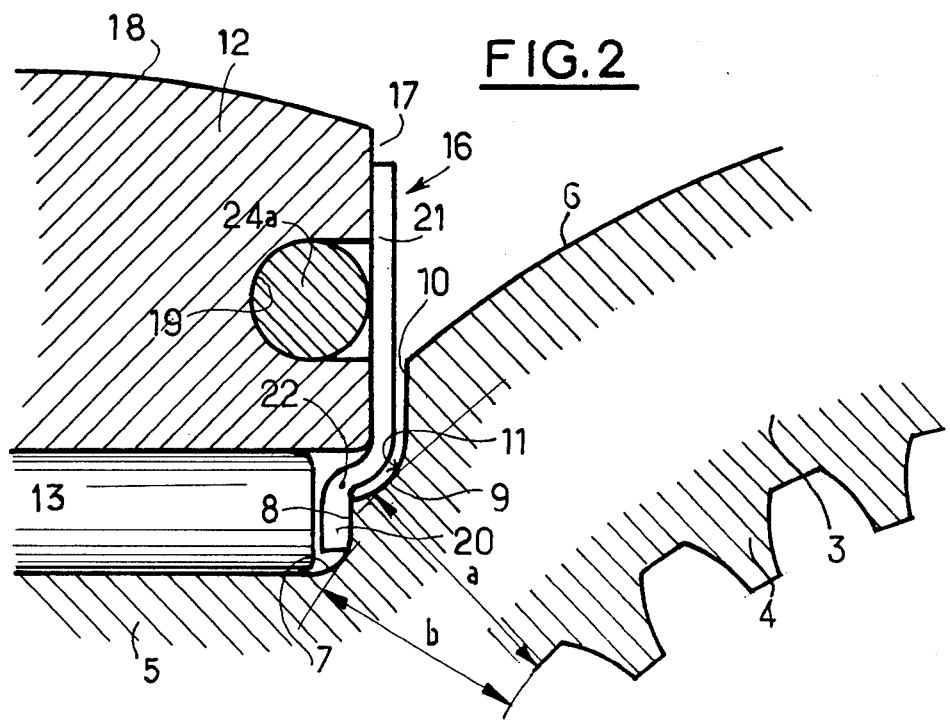
FIG. 2 is a corresponding view, on an enlarged scale, in which the clearance-taking up device is in its fully-compressed state.

As can be seen in FIG. 2, the root of each arm 5 is connected to the outer cylindrical surface 6 of the hub 3 by a first radiused portion 7 which extends angularly a little more than 90°, a first surface 8 perpendicular to the axis X—X and tangent to the radiused portion 7, a second radiused portion 9 extending through an angle less than 90°, and a second surface 10 perpendicular to the axis X—X and tangent to the radiused portion 9 and defining with the latter an annular recess 11.

Each arm 5 carries a roller 12 which is rotatably and slidably mounted thereon through a ring arrangement of needles 13. These needles are axially retained, on the one hand, by an L-section ring 14 retained by a split ring 15 received in a groove provided adjacent the end of the arm 5, and, on the other hand, by a shaped washer 16 which is thin and adjacent the root of the arm 5.

Each roller 12 is defined by its cylindrical inner bore, by two planar faces 17 perpendicular to the axis X—X and by a part-spherical outer surface 18. Provided in the face 17 adjacent the hub 3 is a circular cavity or groove 19 having an axis X—X and a semi-toric inner wall and cylindrical lateral walls.

The washer 16 has an S-shape in half section comprising two planar portions 20 and 21 which extend radially of the axis X—X, and a double radiused portion 22 interconnecting the planar portions 20 and 21. The inner portion 20 is applied against the face 8 of the hub 3 and is in confronting relation to the needles 13. The outer portion 21 is offset from the portion 20 in a direction away from the needles 13 and is received in the recess 11. This portion 21 extends radially from a point located roughly in confronting relation to the wall of the bore of the roller 12 to beyond the groove or recess 19 of this roller.

The tulip element 2 of the joint comprises three pairs of rolling tracks 23 which define three runways having a part-circular section each of which runways receives a roller 12. In order to avoid any contact, when transmitting torque, between the rollers and the tracks not subjected to the transfer force of the torque, the diameter of the runways is slightly greater (for example by 0.02 to 0.15 mm) than that of the rollers. Further, in order to avoid any tapping noise when suddenly reversing the torque, the joint comprises a clearance-taking up device several embodiments of which will now be described.

In FIGS. 1 and 2, the clearance-taking up device 24a comprises a spring having a single coil of metal wire whose diameter is equal to the depth and to the width of the groove 19 and whose overall size, in the compressed state, is equal to this diameter. This spring may be any of those described in the aforementioned French patent application N° 79 04113. It is compressed between the inner end of the groove 19 and the outer portion 21 of the washer 16 so as to permanently bias the roller 12 outwardly of the arm 5.

When no torque is being transmitted by the joint, the latter is in the state shown in FIG. 1. Under the effect of the spring 24a, the outer surface 18 of the roller is in contact with the corresponding track by its outer end, the inner face 17 of the roller is spaced from the washer 16, and the spring 24a partly extends out of the groove 16.

When transmitting torque, the roller slides slightly toward the hub 3 and becomes centered relative to its track and ceases to contact the track 23 which is not subjected to the load.

During operation of the joint, the rollers 12 slide along the arms 5. As can be seen in FIG. 2, their extreme inner position is defined by the contact of their inner face 17 with the outer portion 21 of the washer 16, the spring 24a being then completely pushed into the groove 19.

With the arrangement described hereinbefore, the recess 11 required to permit the free sliding of the rollers may without difficulty be sufficiently small to enable the minimum radial thickness a of the hub 3 in this region (FIG. 2) to be greater than its minimum thickness b in the region of the radiused portion 7. As this thickness b is imposed by the position and the support of the inner end of the needles 13, it can be deduced that the presence of the clearance-taking up device does not reduce the strength of the hub of the tripod element.

By way of a modification, other elastically yieldable means which can withdraw into the groove 19 of the roller may be used instead of the spring 24a.

In FIGS. 3 and 4, there is employed a ring 24b made from a hollow section member of an elastic material such as rubber, expanded polyurethane, etc. This ring must be capable of exerting, as the spring 24a, an axial force F of several kilograms distributed around the periphery of the roller. As the spring 24a, it can completely withdraw into the groove 19 and permit the roller to bear against the shaped washer 16 (FIG. 4).

In FIG. 5, there is employed an elastically yieldable ring structure 24c comprising a ring 25 of expanded elastomer having a portion completely filling the groove 19, this ring extending out of the groove 19 in the free state of the ring by a portion having a rectangular section received in a U-shaped ring 26. The web of the U-shaped ring 26 bears against the washer 16 and the branches of the ring 26 slide in the outer portion of the groove 19. As before, the ring structure 24c is fully withdrawn into the groove 19 when the roller comes in contact with the washer 16, as shown in dotted lines in FIG. 5.

Having now described my invention what I claim as new and desire to secure by Letters Patent is:

1. An articulated transmission joint comprising:
   a male element including a hub having plural arms extending therefrom, each arm having rotatably and slidably mounted thereon a roller;
   a female element defining plural runways each receiving a respective said roller; and
   each said arm including a clearance-taking up device for outwardly biasing the respective said roller away from said hub, each said clearance-taking up device comprising means defining a surface rigid with said hub, a groove in an annular face of said respective roller adjacent said surface rigid with said hub, said groove defining an inner end face, and at least one elastically yieldable means interposed between and in engagement with said surface rigid with said hub and said inner end face of said groove, said elastically yieldable means being fully withdrawable into said groove when it is compressed so that said annular face of said respective roller can engage said respective surface rigid with said hub.

2. A transmission joint as claimed in claim 1, wherein said elastically yieldable means, said surface rigid with said hub and said groove are annular.

3. A transmission joint as claimed in claim 1, wherein a washer mounted on said hub defines said surface rigid with said hub.

4. A transmission joint as claimed in claim 1, wherein said elastically yieldable means comprises a spring having a single coil and having an axial overall size in the compressed state of the spring which is equal to the axial dimension of the section of the metal forming the spring.

5. A transmission joint as claimed in claim 1, wherein said elastically yieldable means comprises a compressible member of elastomer.

6. A transmission joint as claimed in claim 5, further comprising a U-shaped support which is open in the direction of said roller and which is slidably mounted in said groove and supports the corresponding compressible member which is disposed in said U-shaped member.

7. A transmission joint as claimed in claim 1, wherein said elastically yieldable means comprises a compressible member of expanded plastics material.

8. A transmission joint as claimed in claim 7, further comprising a U-shaped support which is open in the direction of said roller and which is slidably mounted in said groove and supports the corresponding compressible member which is disposed in said U-shaped member.

9. An articulated transmission joint comprising:
   a male element including a hub having plural arms extending therefrom, each arm having rotatably and slidably mounted thereon a roller;
   a female element defining plural runways each receiving a respective said roller; and
   each said arm including a clearance-taking up device for outwardly biasing the respective said roller away from said hub, each said clearance-taking up device comprising a washer mounted on said hub and defining a surface which is rigid with said hub with interposition of needles between each said roller and the respective said arm, a groove in an annular face of said respective roller adjacent said surface rigid with said hub, said groove defining an inner end face, and at least one elastically yieldable means interposed between and in engagement with said surface rigid with said hub and said inner end face of said groove, said elastically yieldable means being fully withdrawable into said groove when it is compressed, each said washer also constituting retaining washer for respective said needles.

10. A transmission joint as claimed in claim 9, wherein said washer has a half-sectional shape comprising two portions which are radially disposed relative to the respective said arm, a radially outer said portion of said washer being offset in a direction away from said roller relative to a radially inner said portion of said washer.

* * * * *